(12) United States Patent
Wang et al.

(10) Patent No.: US 11,669,046 B2
(45) Date of Patent: Jun. 6, 2023

(54) DISPLAY DEVICE AND OPERATING METHOD THEREOF

(71) Applicants: Interface Technology (ChengDu) Co., Ltd., Sichuan (CN); Interface Optoelectronics (ShenZhen) Co., Ltd., Guangdong (CN); Interface Optoelectronics (Wuxi) Co., Ltd., Jiangsu (CN); General Interface Solution Limited, Miaoli County (TW)

(72) Inventors: Shih-Yu Wang, Guangdong (CN); Chun-Ta Chen, Guangdong (CN); Shiuan-Huei Lin, Guangdong (CN); Zih-Fan Chen, Guangdong (CN); Wan-Lin Li, Guangdong (CN); Yi-Hsin Lin, Guangdong (CN); Yu-Jen Wang, Guangdong (CN); Wei-Cheng Cheng, Guangdong (CN); Chang-Nien Mao, Guangdong (CN)

(73) Assignees: Interface Technology (ChengDu) Co., Ltd., Sichuan (CN); Interface Optoelectronics (SingZhen) Co., Ltd., Guangdong (CN); Interface Optoelectronics (Wuxi) Co., Ltd., Jiangsu (CN); General Interface Solution Limited, Miaoli County (TW)

( * ) Notice: Subject to any disclaimer, the term of this patent is extended or adjusted under 35 U.S.C. 154(b) by 0 days.

(21) Appl. No.: 17/326,351

(22) Filed: May 21, 2021

(65) Prior Publication Data

US 2022/0317627 A1    Oct. 6, 2022

(30) Foreign Application Priority Data

Apr. 6, 2021   (CN) .......................... 202110366217.4

(51) Int. Cl.
  *G02B 27/01*      (2006.01)
  *G03H 1/22*       (2006.01)
  (Continued)

(52) U.S. Cl.
  CPC ....... *G03H 1/2202* (2013.01); *G02B 27/0172* (2013.01); *G02F 1/29* (2013.01);
  (Continued)

(58) Field of Classification Search
  CPC ............ G02B 27/0172; G02B 27/0101; G02B 2027/0174; G02B 5/18; G02B 5/32; G02B 27/4205
  See application file for complete search history.

(56) References Cited

U.S. PATENT DOCUMENTS 6,859,333 B1 *   2/2005   Ren .......................... G02B 3/14
                                                            359/666
10,775,633 B1 *   9/2020   Lee ..................... G02B 27/0179
(Continued)

FOREIGN PATENT DOCUMENTS

WO    WO-2022052949 A1 *   3/2022   ............. G02B 27/01

*Primary Examiner* — Yuzhen Shen
(74) *Attorney, Agent, or Firm* — CKC & Partners Co., LLC

(57) ABSTRACT

A display device includes a light source, a waveguide element, a liquid crystal coupler, a first holographic optical element and a second holographic optical element. The light source is configured to emit light. The waveguide element is located above the light source. The liquid crystal coupler is located between the waveguide element and the light source. The first holographic optical element is located on a top surface of the waveguide element, in which the liquid crystal coupler is configured to change an incident angle that the light emits to the first holographic optical element. The second holographic optical element is located on the top surface of the waveguide element, and there is a first (Continued)

distance in a horizontal direction between the first holographic optical element and the second holographic optical element, in which the second holographic optical element is configured to diffract the light to the waveguide element below.

16 Claims, 8 Drawing Sheets

(51) Int. Cl.
  *G02F 1/29* (2006.01)
  *G09G 3/34* (2006.01)
  *G09G 3/36* (2006.01)
(52) U.S. Cl.
  CPC ............ *G09G 3/3413* (2013.01); *G09G 3/36* (2013.01); *G02B 2027/0123* (2013.01); *G02B 2027/0174* (2013.01); *G03H 2223/16* (2013.01); *G03H 2223/18* (2013.01); *G03H 2223/23* (2013.01)

(56) References Cited

U.S. PATENT DOCUMENTS

| | | | |
|---|---|---|---|
| 2006/0007102 A1* | 1/2006 | Yasuoka | G09G 3/3611 345/102 |
| 2019/0018278 A1* | 1/2019 | Wang | G02B 5/1871 |
| 2019/0056635 A1* | 2/2019 | Kim | G02B 30/56 |
| 2019/0129257 A1* | 5/2019 | Wang | G02F 1/134309 |
| 2019/0293951 A1* | 9/2019 | Li | G02B 30/27 |
| 2020/0310121 A1* | 10/2020 | Choi | G02B 5/32 |
| 2021/0191122 A1* | 6/2021 | Yaroshchuk | G02B 27/0081 |
| 2021/0199971 A1* | 7/2021 | Lee | G02B 27/0172 |

* cited by examiner

DISPLAY DEVICE AND OPERATING METHOD THEREOF

RELATED APPLICATION

This application claims priority to China Application Serial Number 202110366217.4, filed Apr. 6, 2021, which is herein incorporated by reference in its entirety.

BACKGROUND

Field of Invention

The present disclosure relates to a display device and an operating method of the display device.

Description of Related Art

In general, augmented Reality (AR) glasses usually have a light source, a lens, and an optical combiner, so that the light emitted by the light source may be combined with the real scene by the lens and the optical combiner to achieve an effect of providing users information. However, when the optical combiner uses a waveguide element and a geometric grating as a combination, an ambient light penetration of the geometric grating is low, and the augmented reality glasses may generate ghost images, resulting in a declination of the yield rate of the augmented reality glasses. Moreover, when the optical combiner is combined with a waveguide element and a diffraction grating, since the light emitted by the light source is diffracted in the optical combiner, an energy of the light may be dispersed and not concentrated, resulting in reduced light efficiency, and the diffraction effect of the grating is related to a wavelength of the light, so it may not achieve an effect of high commonality. For example, when the optical combiner directly stacks three volumetric holographic gratings on the waveguide element, a form factor is small but crosstalk between the colors of the light may occur.

SUMMARY

An aspect of the present disclosure is related to a display device.

According to an embodiment of the present disclosure, a display device includes a light source, a waveguide element, a liquid crystal coupler, a first holographic optical element and a second holographic optical element. The light source is configured to emit light. The waveguide element is located above the light source. The liquid crystal coupler is located between the waveguide element and the light source. The first holographic optical element is located on a top surface of the waveguide element, in which the liquid crystal coupler is configured to change an incident angle that the light emits to the first holographic optical element. The second holographic optical element is located on the top surface of the waveguide element, and there is a first distance in a horizontal direction between the first holographic optical element and the second holographic optical element, in which the second holographic optical element is configured to diffract the light to the waveguide element below.

In an embodiment of the present disclosure, the liquid crystal coupler is a liquid crystal lens group, the liquid crystal lens group comprises a first lens, a transparent electrode and a first liquid crystal layer, and the first liquid crystal layer is located between the first lens and the transparent electrode.

In an embodiment of the present disclosure, the liquid crystal lens group is configured to change an optical axis direction of the first lens by adjusting an electric field of the first liquid crystal layer.

In an embodiment of the present disclosure, the liquid crystal lens group further comprises a second lens and a second liquid crystal layer, the transparent electrode is located between the first liquid crystal layer and the second liquid crystal layer, and the second liquid crystal layer is located between the second lens and the transparent electrode.

In an embodiment of the present disclosure, a longitudinal direction of liquid crystal of the first liquid crystal layer is different from a longitudinal direction of liquid crystal of the second liquid crystal layer.

In an embodiment of the present disclosure, the liquid crystal coupler is a liquid crystal prism, the liquid crystal prism comprises a substrate, a transparent electrode and a liquid crystal layer, and the transparent electrode is located on the substrate, and the liquid crystal layer is located on the transparent electrode.

In an embodiment of the present disclosure, the liquid crystal prism is configured to rotate liquid crystal of the liquid crystal layer to a vertical direction to change a refractive index of the liquid crystal prism by changing a voltage of the transparent electrode.

In an embodiment of the present disclosure, the liquid crystal prism is configured to rotate liquid crystal of the liquid crystal layer to a horizontal direction to change a refractive index of the liquid crystal prism by changing a voltage of the transparent electrode.

In an embodiment of the present disclosure, the liquid crystal coupler is a liquid crystal grating, the liquid crystal grating comprises a substrate, transparent electrodes and a liquid crystal layer, the transparent electrodes are located on the substrate, and the liquid crystal layer is located on the transparent electrodes.

In an embodiment of the present disclosure, the transparent electrodes of the liquid crystal grating are separated from each other by a second distance.

In an embodiment of the present disclosure, the liquid crystal grating is configured to rotate a portion of liquid crystal of the liquid crystal layer to a vertical direction by changing a voltage of the transparent electrodes.

In an embodiment of the present disclosure, the light source is configured to emit red light, green light and blue light into the liquid crystal coupler at intervals.

In an embodiment of the present disclosure, the liquid crystal coupler is configured to control the red light, the green light and the blue light to be emitted to the first holographic optical element at different incident angles.

In an embodiment of the present disclosure, the second holographic optical element is configured to diffract the red light, the green light and the blue light, and the red light, the green light and the blue light after being diffracted by the second holographic optical element all have a same emergent angle.

In an embodiment of the present disclosure, the second holographic optical element has a first grating, a second grating, and a third grating, and the first grating, the second grating and the third grating are adjacently disposed along the horizontal direction.

In an embodiment of the present disclosure, the first grating, the second grating and the third grating are red, green and blue, respectively.

In an embodiment of the present disclosure, the first grating is closer to the first holographic optical element than the third grating, and a refractive index of the first grating is lower than a refractive index of the third grating.

In an embodiment of the present disclosure, a refractive index of the second grating is higher than a refractive index of the first grating and is lower than a refractive index of the third grating.

Another aspect of the present disclosure is related to an operating method of a display device.

According to an embodiment of the present disclosure, an operating method of a display device comprising: emitting light from a light source into a liquid crystal coupler; using the liquid crystal coupler to change an incident angle that the light emits to a first holographic optical element, wherein the first holographic optical element is located on a top surface of a waveguide element; diffracting the light by the first holographic optical element, such that the light is totally reflected in the waveguide element; and diffracting the light by a second holographic optical element located on the top surface of the waveguide element, such that the light is transmitted to the waveguide element below.

In an embodiment of the present disclosure, emitting the light from the light source into the liquid crystal coupler further comprises emitting red light, green light and blue light into the liquid crystal coupler at intervals.

In the embodiments of the present disclosure, the liquid crystal coupler of the display device may change the incident angle that the light emits to the first holographic optical element, and the first holographic optical element has a mirror function, transmitting the light to the waveguide element, so that the light is totally reflected in the waveguide element to transmit the light to the second holographic optical element. The second holographic optical element has a high sensitivity to an initial diffraction angle of the light. The light in the waveguide element is decoupled only when passing through a specific position of the second holographic optical element (for example, the first, second or third grating), so as to transmit the light below the waveguide element. In this way, the energy of the light is concentrated and not easy to disperse, so the display device has characteristics of high optical efficiency, high field of view (FOV) and high Eye Box.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
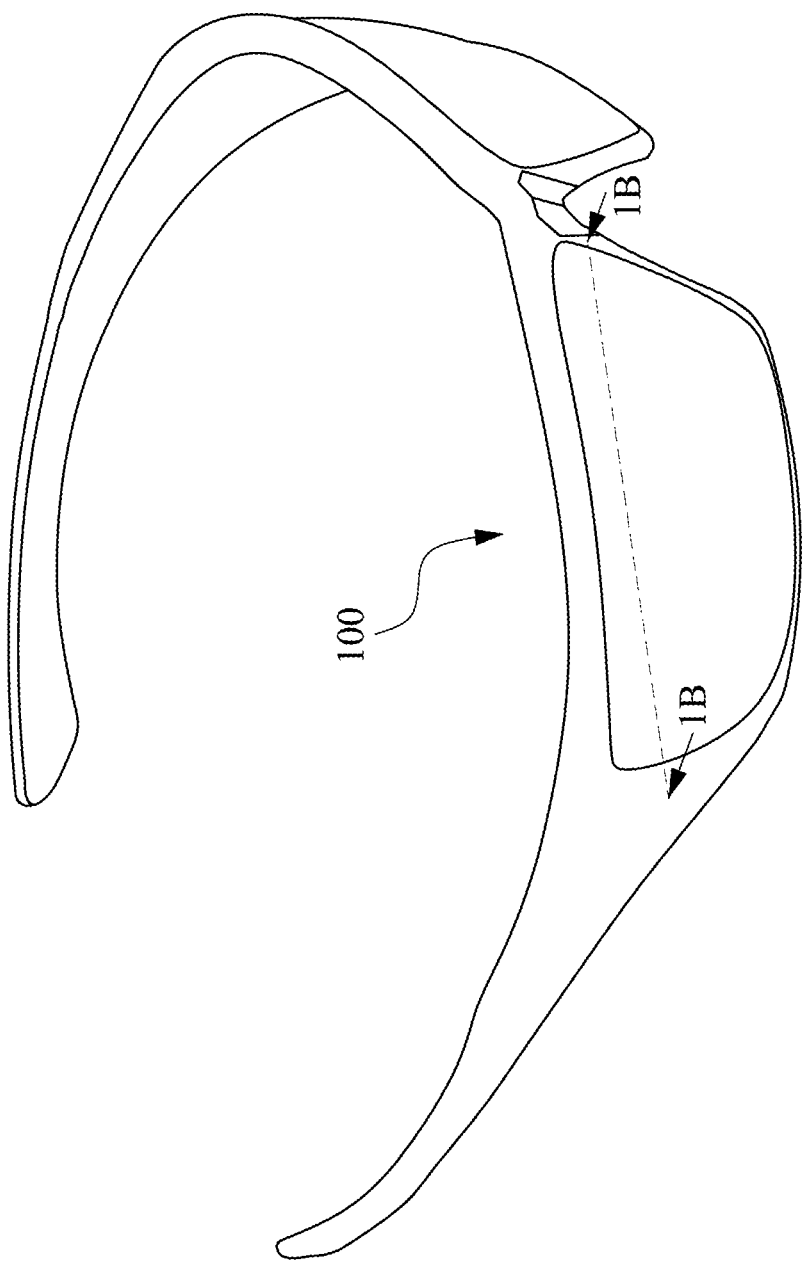
FIG. 1A illustrates a stereoscopic view of a wearing device according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper," "front," "back" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1A illustrates a stereoscopic view of a wearing device 200 according to one embodiment of the present disclosure. For example, the wearing device 200 may be augmented reality glasses, but it is not limited in this regard. The wearing device 200 includes a display device 100. The display device 100 may be a portion of the augmented reality glasses. Therefore, when users wear the augmented reality glasses, the users may receive the information provided by the display device 100 and combine the information of the display device 100 with the information of the ambient light. In the following description, a structure of the display device 100 will be described.

Figure 1B:
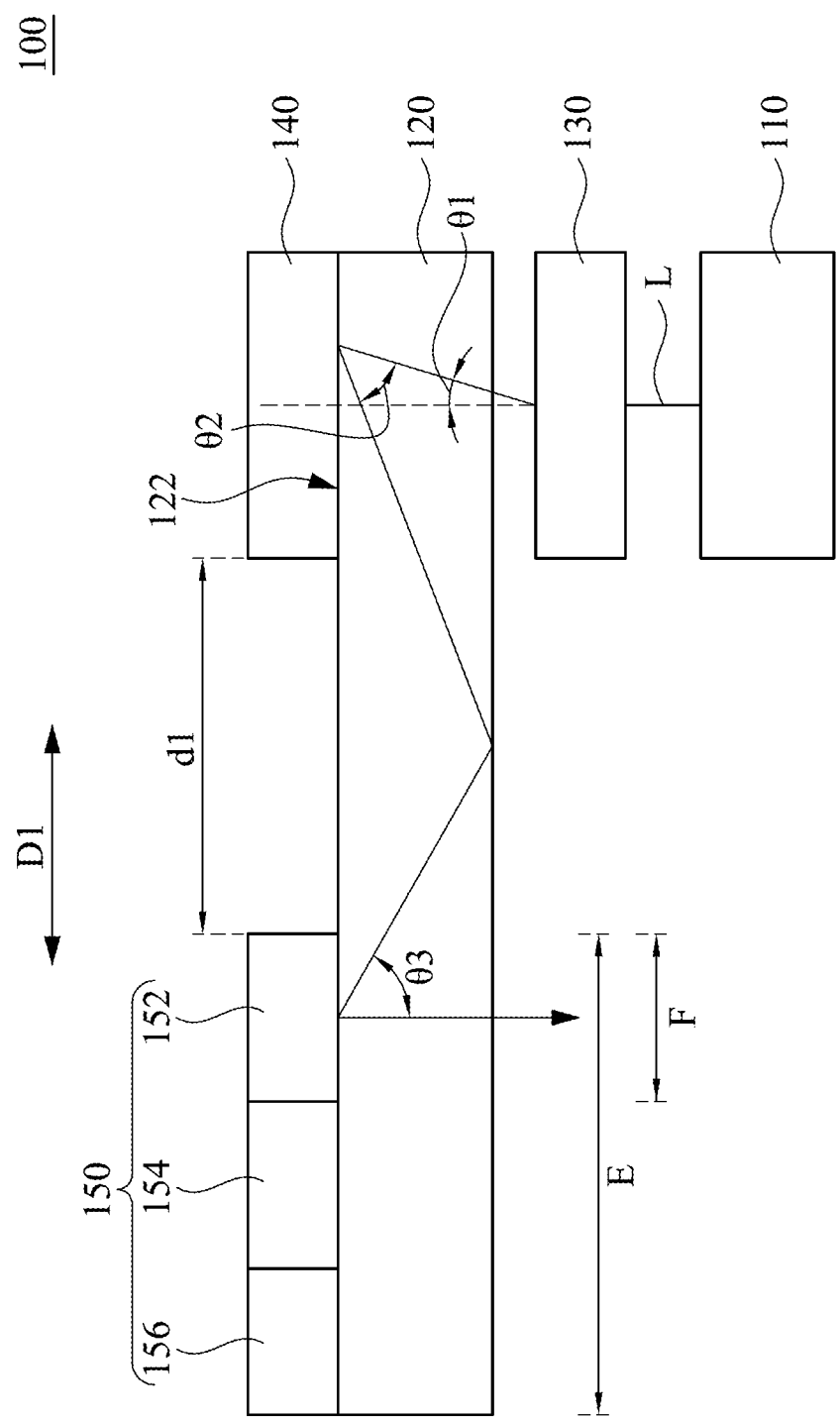
FIG. 1B illustrates a cross-sectional view of the display device in FIG. 1A along a line segment 1B-1B.

FIG. 1B illustrates a cross-sectional view of the display device 100 in FIG. 1A along a line segment 1B-1B. The display device 100 includes a light source 110, a waveguide element 120, a liquid crystal coupler 130, a first holographic optical element 140 and a second holographic optical element 150. The light source 110 is configured to emit light L. For example, the light source 110 may include displays, and the light L may include image information displayed on the displays, but it is not limited in this regard. The waveguide element 120 is located above the light source 110 and above the liquid crystal coupler 130. The waveguide element 120 has a total reflection function, so that the light L may be transmitted in the waveguide element 120 with total reflection. The liquid crystal coupler 130 is located between the waveguide element 120 and the light source 110. The first holographic optical element 140 is located on a top surface 122 of the waveguide element 120, wherein the liquid crystal coupler 130 is configured to change an incident angle θ1 that the light L emits to the first holographic optical element 140.

The first holographic optical element 140 may be a coupled grating. When the light L passes through the first holographic optical element 140, it may have an initial diffraction angle θ2 and may produce a coupling effect, so that the light L may be totally reflected in the waveguide element 120. The second holographic optical element 150 is located on the top surface 122 of the waveguide element 120, and the second holographic optical element 150 and the first holographic optical element 140 are separated by a first distance d1 in a horizontal direction D1, that is, the first holographic optical element 140 is separated from the second holographic optical element 150. The second holographic optical element 150 is configured to diffract the light L to below the waveguide element 120. The second holographic optical element 150 may be a decoupling grating, that is, when the light L passes through the second holographic optical element 150, it may have an emergent angle θ3, so that the light L may be transmitted to the waveguide element 120 below.

For example, when the users' eyes are located directly below a field of view F (for example, directly below a first grating 152), the liquid crystal coupler 130 of the display device 100 may change the incident angle θ1 that the light L emits to the first holographic optical element 140, and after the light L passes through the first holographic optical element 140, the first holographic optical element 140 may provide a coupling effect and have an initial diffraction angle θ2, so that the light L may be totally reflected in the waveguide element 120. Next, the second holographic optical element 150 is highly sensitive to the initial diffraction angle θ2 of the light L, that is, when the light L passes through the second holographic optical element 150, the light L may be decoupled and may transmit to right below the field of view F, such that the light L emitted by the light source 110 may be combined with the ambient light and received by the users to achieve the effect of providing information.

In detail, the liquid crystal coupler 130 of the display device 100 may change the incident angle θ1 that the light L emits to the first holographic optical element 140, and the first holographic optical element 140 has a mirror function, transmitting the light L to the waveguide element 120, so that the light L is totally reflected in the waveguide element 120 to transmit the light L to the second holographic optical element 150. The second holographic optical element 150 has a high sensitivity to an initial diffraction angle θ2 of the light L, that is, only when the light L passes through a specific position of the second holographic optical element 150 (for example, the first grating 152, a second grating 154 or a third grating 156), the light L is decoupled and transmits the light L to the waveguide element 120 below. As a result, the energy of the light L is concentrated and not easy to disperse, so the display device 100 has characteristics of high optical efficiency, the high field of view F (FOV) and a high Eye Box E.

Figure 2:
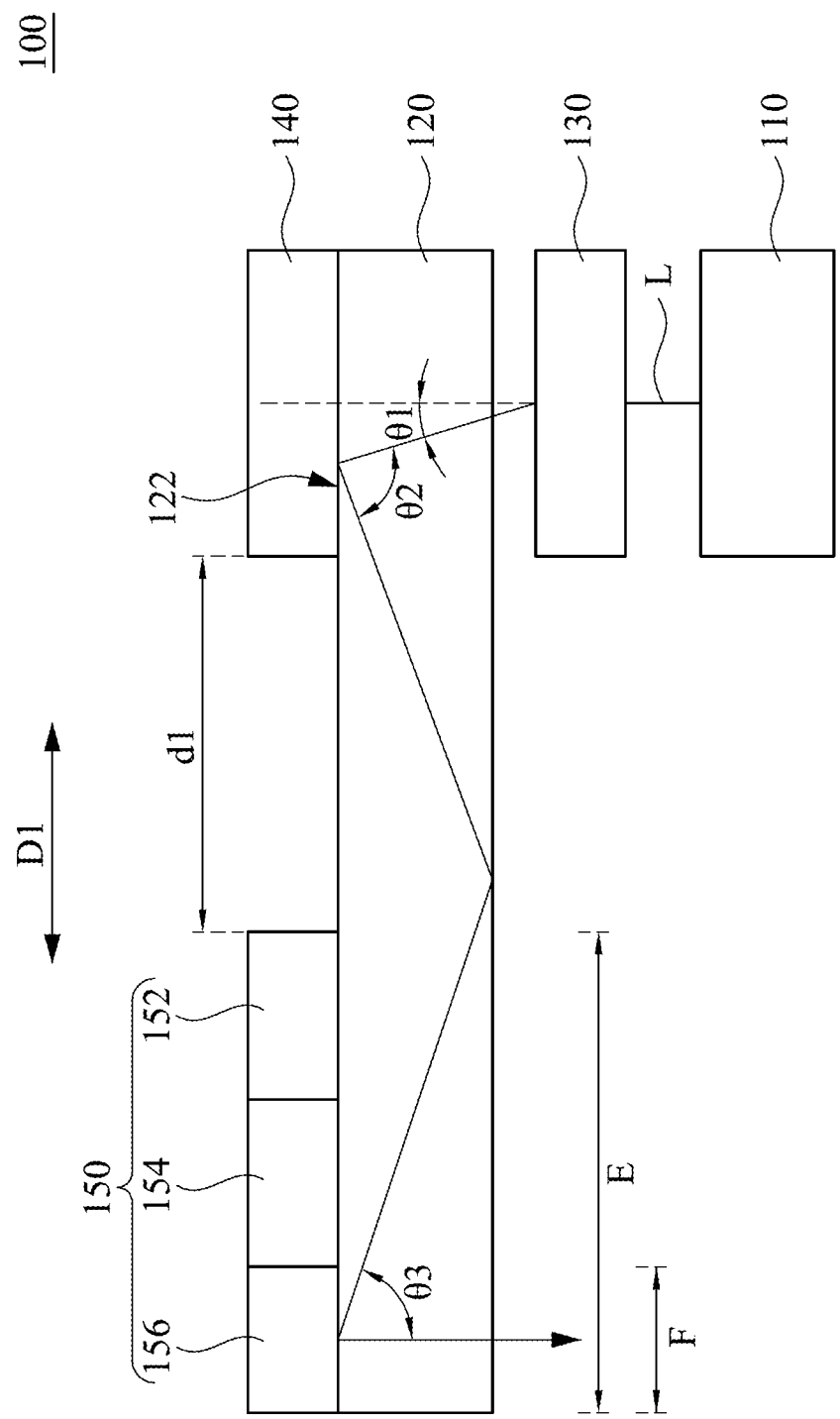
FIG. 2 illustrates a cross-sectional view of a display device according to another embodiment of the present disclosure.

FIG. 2 illustrates a cross-sectional view of the display device 100 according to another embodiment of the present disclosure. Referring to FIG. 2, when the users' eyes are located directly below the field of view F (for example, directly below the third grating 156), the liquid crystal coupler 130 of the display device 100 may change the incident angle θ1 that the light L emits to the first holographic optical element 140, and after the light L passes through the first holographic optical element 140, the light L may be totally reflected in the waveguide element 120. Next, after the light L passes through the second holographic optical element 150, the light L may be transmitted to right below the field of view F, such that the light L emitted by the light source 110 may be combined with the ambient light and received by the users. In detail, whether the users' eyes are directly below the third grating 156 (as shown in FIG. 2) or directly below the first grating 152 (as shown in FIG. 1B), the users may receive the light L emitted by the light source 110. Therefore, the display device 100 has the characteristics of high commonality and high Eye Box E.

In one embodiment, the light source 110 of the display device 100 is configured to emit red light, green light and blue light into the liquid crystal coupler 130 at intervals. For example, the light L emitted by the light source 110 may be red, green and blue light emitted by the light source 110 at intervals. For example, the light source 110 first emits the red light, and after 3 milliseconds (ms), the light source 110 changes to emit the green light, and after another 3 ms, the light source 110 changes to emit the blue light, and the red light, the green light and the blue light are emitted according to this cycle. Next, the liquid crystal coupler 130 of the display device 100 is configured to control the red light, the green light and the blue light to emit to the first holographic optical element 140 at different incident angles θ1, so that the red light, the green light and the blue light have different initial diffractions angle θ2. Next, the second holographic optical element 150 of the display device 100 is configured to diffract the red, the green and the blue light. As a result, the red, the green and the blue light diffracted by the second holographic optical element 150 may have the same emergent angle θ3, such that the red light, the green light and the blue light may be transmitted to below the waveguide element 120 at intervals for users' eyes to receive.

In addition, in one embodiment, the second holographic optical element 150 may have the first grating 152, the second grating 154 and the third grating 156. The first grating 152, the second grating 154 and the third grating 156 may be disposed adjacent to each other along the horizontal direction D1, which is beneficial to reduce a thickness of the display device 100. The first grating 152, the second grating 154 and the third grating 156 may be red, green and blue, respectively. The first grating 152 is closer to the first holographic optical element 140 than the third grating 156, and the first grating 152 is separated from the first holographic optical element 140 by the first distance d1. a refractive index of the first grating 152 is lower than a refractive index of the third grating 156, and a refractive index of the second grating 154 is higher than the refractive index of the first grating 152 but lower than the refractive index of the third grating 156.

In the following description, different types of the liquid crystal coupler 130 will be described. The liquid crystal coupler 130 may selectively be a liquid crystal lens group 130a in FIG. 3A, a liquid crystal prism 130b in FIG. 4, a liquid crystal prism 130c in FIG. 5 and the liquid crystal grating 130d in FIG. 6.

Figures 3A, 3B:
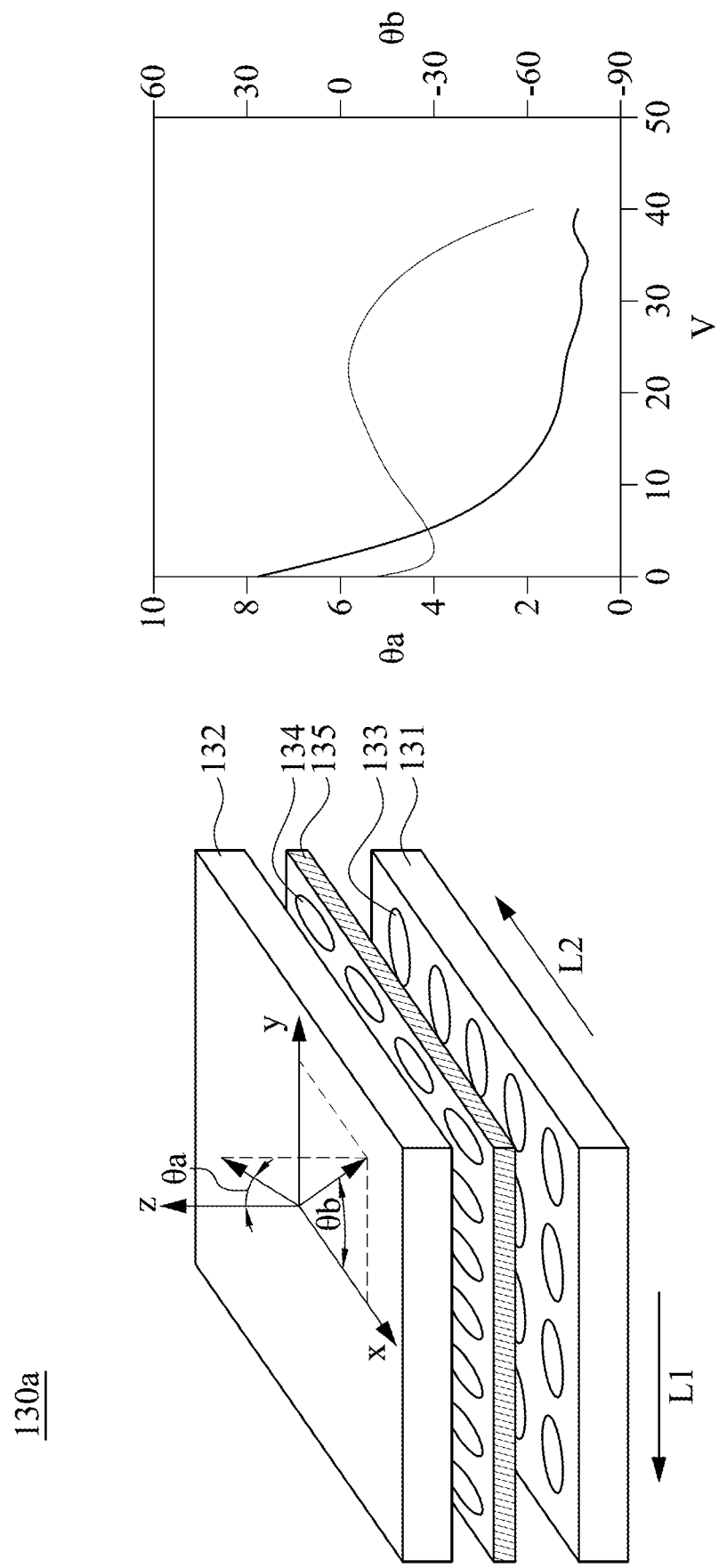
FIG. 3A illustrates a stereoscopic view of a liquid crystal lens group according to one embodiment of the present disclosure.
FIG. 3B illustrates a schematic view showing a relationship between voltage and angles of the liquid crystal lens group according to one embodiment of the present disclosure.

FIG. 3A illustrates a stereoscopic view of a liquid crystal lens group 130a according to one embodiment of the present disclosure. FIG. 3B illustrates a schematic view showing a relationship between voltage V and angles θa, θb of the liquid crystal lens group 130a according to one embodiment of the present disclosure. Referring to both FIG. 3A and FIG. 3B, the liquid crystal lens group 130a is the liquid crystal coupler 130 shown in FIG. 1B and FIG. 2. The liquid crystal lens group 130a includes a first lens 131, a first liquid crystal layer 133 and a transparent electrode 135. The first liquid crystal layer 133 is located between the first lens 131 and the transparent electrode 135. In addition, the liquid crystal lens group 130a further includes a second lens 132 and a second liquid crystal layer 134. The transparent electrode 135 is located between the first liquid crystal layer 133 and the second liquid crystal layer 134. The second liquid crystal layer 134 is located between the second lens 132 and the transparent electrode 135. In addition, a longitudinal direction of liquid crystal of the first liquid crystal layer 133 is different from a longitudinal direction of liquid crystal of the second liquid crystal layer 134.

In one embodiment, electric fields of the first liquid crystal layer 133 and the second liquid crystal layer 134 may be adjusted to change an optical axis direction of the liquid crystal lens group 130a. In detail, the voltage V of the transparent electrode 135 determines the electric fields of the first liquid crystal layer 133 and the second liquid crystal layer 134, and the electric fields of the first liquid crystal layer 133 and the second liquid crystal layer 134 determine the angles θa, θb, and the angles θa, θb determine the optical axis direction of the liquid crystal lens group 130a, that is, the angles θa, θb determine a direction of the light L (see FIG. 1B) after passing through the liquid crystal lens group 130a.

As shown in FIG. 3B, when the voltage V of the transparent electrode 135 changes, the angles θa and θb also change. Therefore, when the angles θa and θb change, the optical axis direction of the liquid crystal lens group 130a also changes, that is, the direction of the light L after passing through the liquid crystal lens group 130a also changes. As a result, the liquid crystal lens group 130a may adjust the voltage V of the transparent electrode 135 to change the electric fields of the first liquid crystal layer 133 and the second liquid crystal layer 134 to drive the angles θa and θb to change, so that the liquid crystal lens group 130 may change the incident angle θ1 (see FIG. 1B) that the light L emits to the first holographic optical element 140 (see FIG. 1B).

It is to be noted that the connection relationship of the aforementioned elements will not be repeated. In the following description, other types of liquid crystal couplers will be described.

Figure 4:
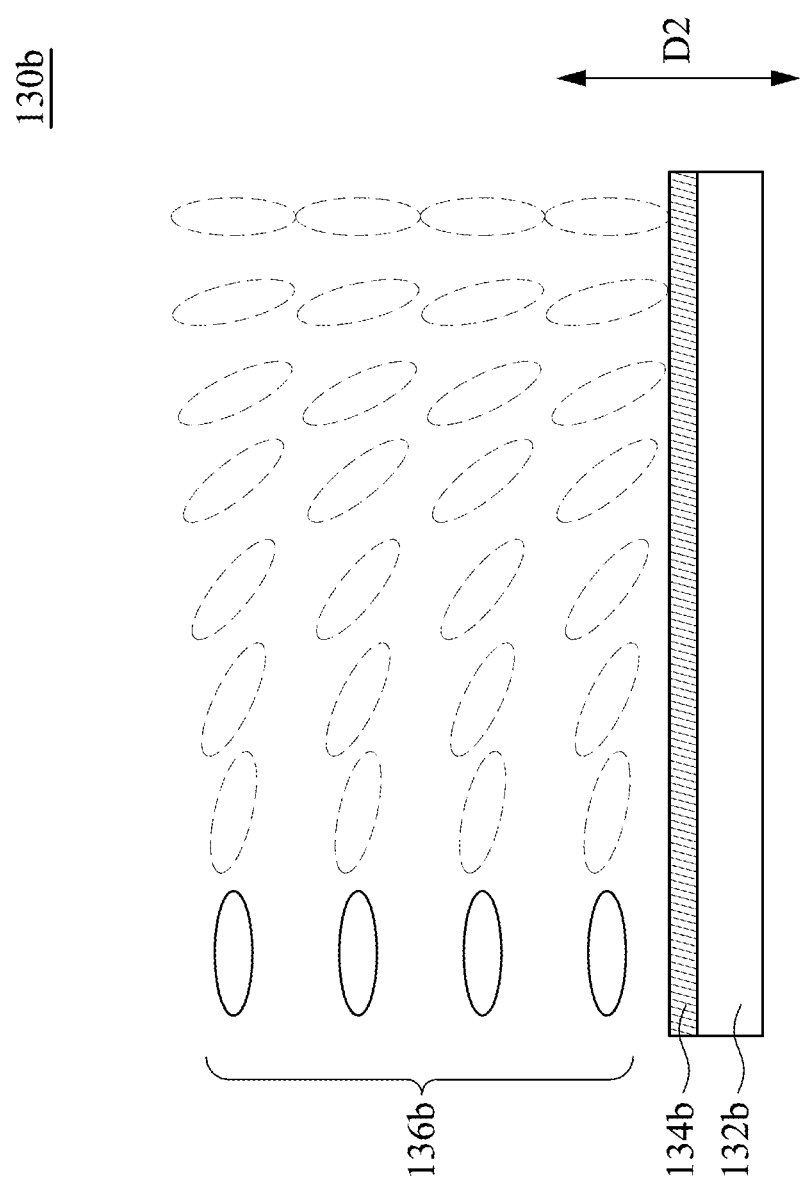
FIG. 4 illustrates a stereoscopic view of a liquid crystal prism according to another embodiment of the present disclosure.

FIG. 4 illustrates a stereoscopic view of a liquid crystal prism 130b according to another embodiment of the present disclosure. Referring to both FIG. 1B and FIG. 4, in one embodiment, the liquid crystal prism 130b is the liquid crystal coupler 130 shown in FIG. 1B and FIG. 2. The liquid crystal prism 130b includes a substrate 132b, a transparent electrode 134b and a liquid crystal layer 136b. The transparent electrode 134b is located on the substrate 132b. The liquid crystal layer 136b is located on the transparent electrode 134b. The liquid crystal prism 130b is configured to rotate liquid crystal of the liquid crystal layer 136b in a vertical direction D2 to change a refractive index of the liquid crystal prism 130b by changing a voltage of the transparent electrode 134b. In detail, the liquid crystal shown by dotted lines shows a stage that the voltage of the transparent electrode 134b is changed. For example, when the voltage of the transparent electrode 134b is 0, the liquid crystal of the liquid crystal layer 136b is in a horizontal state, and when the voltage of the transparent electrode 134b continues to increase, the electric field of the liquid crystal layer 136b changes, so that the liquid crystal of the liquid crystal layer 136b is changed from the horizontal state to a state that the liquid crystal rotates to the vertical direction D2. Next, when the voltage of the transparent electrode 134b increases to a saturation value, the longitudinal direction of the liquid crystal of the liquid crystal layer 136b is parallel to the vertical direction D2, such as the rightmost liquid crystal of the liquid crystal layer 136b.

Furthermore, when the liquid crystal of the liquid crystal layer 136b rotates in the vertical direction D2, the refractive index of the liquid crystal prism 130b changes, so that the direction of the light L after passing through the liquid crystal prism 130b also changes. Therefore, the liquid crystal prism 130b may change the refractive index of the liquid crystal prism 130b to change the incident angle θ1 that the light L emits to the first holographic optical element 140. When the light L passes through the first holographic optical element 140, the first holographic optical element 140 may provide a coupling effect and the light L may have an initial diffraction angle θ2, so that the light L may be totally reflected in the waveguide element 120. After the light L passes through the second holographic optical element 150, it may have the emergent angle θ3, so that the light L may be transmitted to the waveguide element 120 below.

Figure 5:
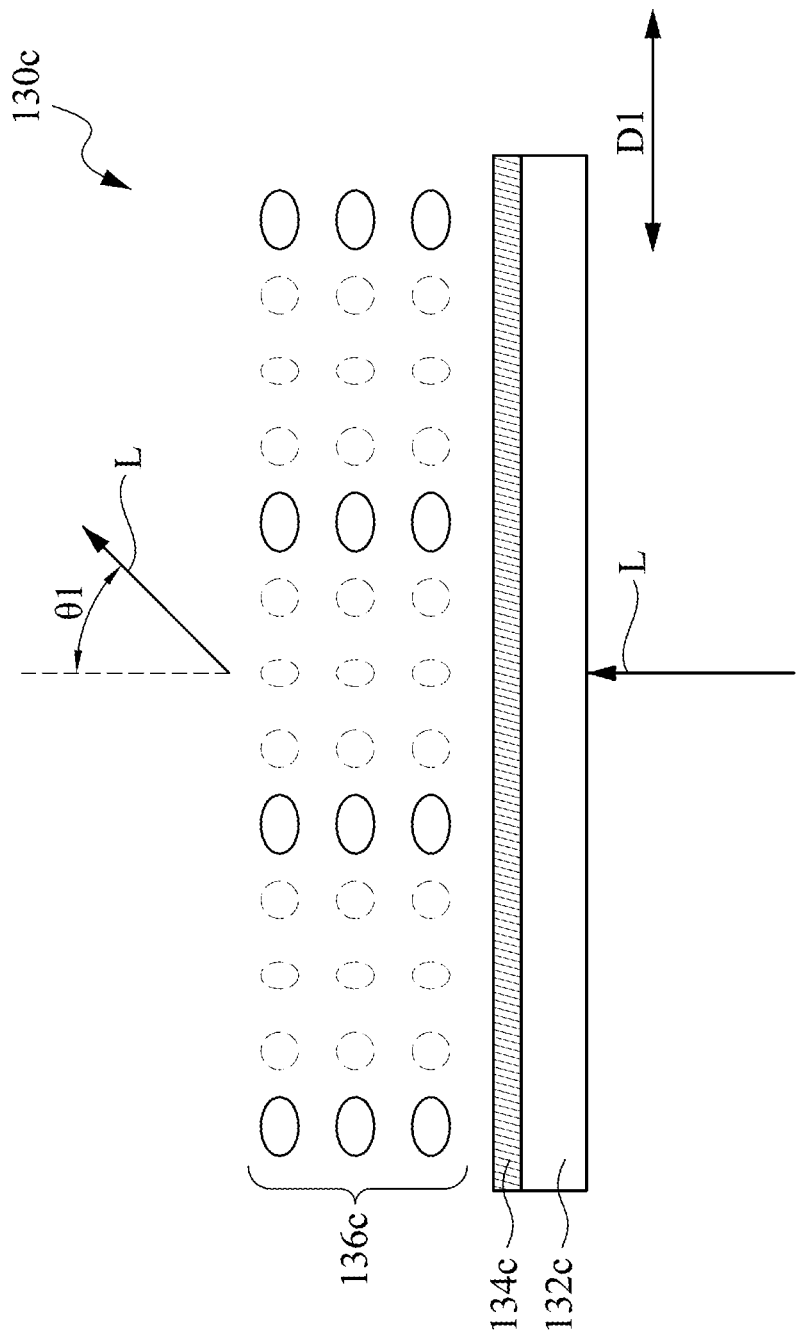
FIG. 5 illustrates a schematic view of a liquid crystal prism according to another embodiment of the present disclosure.

FIG. 5 illustrates a schematic view of a liquid crystal prism 130c according to another embodiment of the present disclosure. Referring to both FIG. 1B and FIG. 5, in one embodiment, the liquid crystal prism 130c is the liquid crystal coupler 130 shown in FIG. 1B and FIG. 2. The liquid crystal prism 130c includes a substrate 132c, a transparent electrode 134c and a liquid crystal layer 136c. The transparent electrode 134c is located on the substrate 132c, and the liquid crystal layer 136c is located on the transparent electrode 134c. The liquid crystal prism 130c is configured to change a voltage of the transparent electrode 134c. The difference from the embodiment shown in FIG. 4 is that the liquid crystal of the liquid crystal layer 136c rotates in the horizontal direction D1 to change a refractive index of the liquid crystal ridge 130c. In detail, liquid crystal shown by dotted lines is a state that the voltage of the transparent electrode 134c is changed. For example, when the voltage of the transparent electrode 134c is 0, the liquid crystal of the liquid crystal layer 136c is in a solid line state. When the voltage of the transparent electrode 134c continues to increase, an electric field of the liquid crystal layer 136c changes, such that the liquid crystal of the liquid crystal layer 136c rotates in the horizontal direction D1.

Furthermore, when the liquid crystal of the liquid crystal layer 136c rotates in the horizontal direction D1 (for example, rotates in a direction perpendicular to the paper surface), the refractive index of the liquid crystal prism 130c changes accordingly, so that a direction that the light L passes through the liquid crystal prism 130c changes. Therefore, the liquid crystal prism 130c may change the refractive index of the liquid crystal prism 130c to change the incident angle θ1 that the light L emits to the first holographic optical element 140. When the light L passes through the first holographic optical element 140, the first holographic optical element 140 may provide a coupling effect and the light L may have an initial diffraction angle θ2, so that the light L may be totally reflected in the waveguide element 120. After the light L passes through the second holographic optical element 150, it may have the emergent angle θ3, so that the light L may be transmitted to the waveguide element 120 below.

Figure 6:
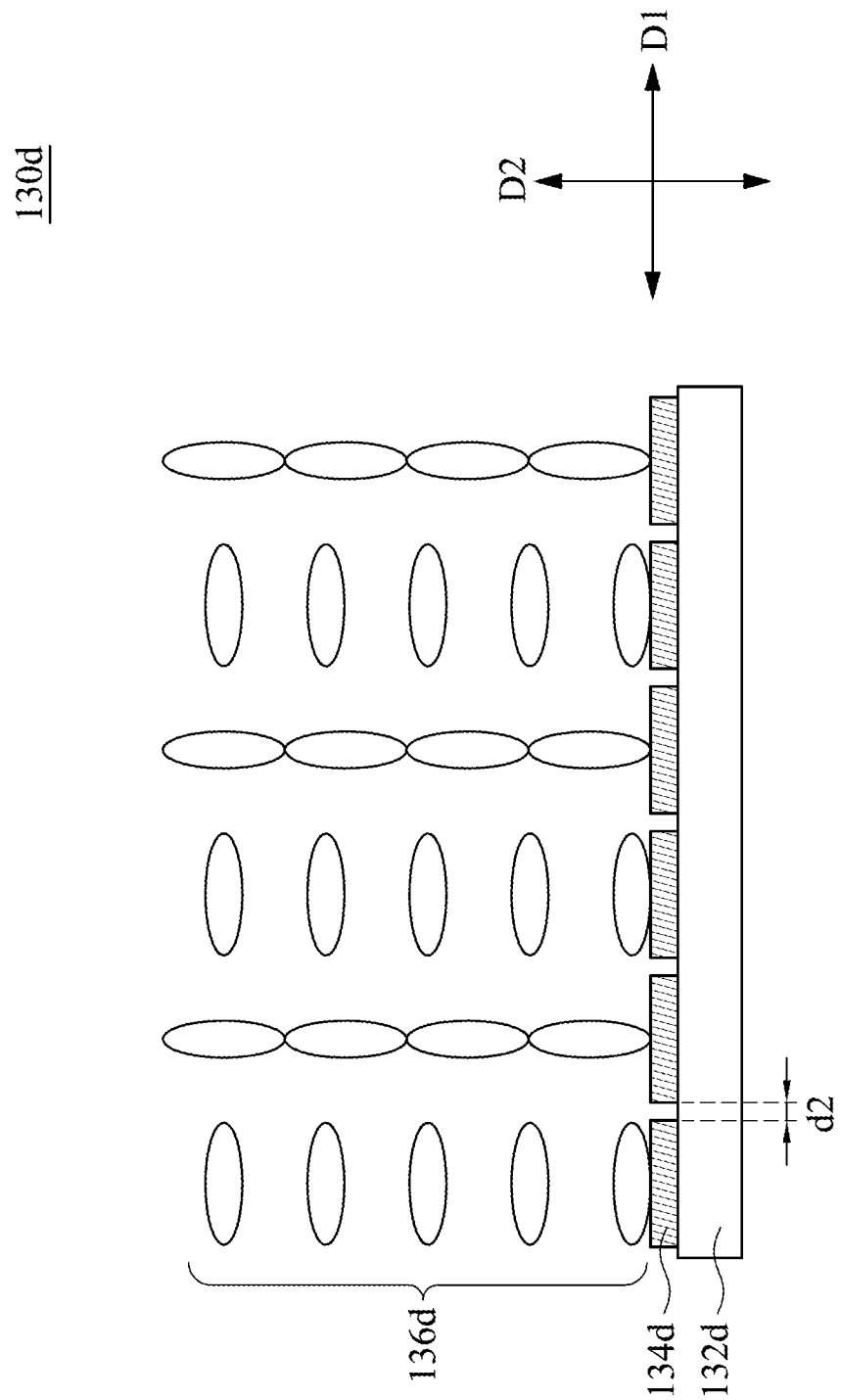
FIG. 6 illustrates a stereoscopic view of a liquid crystal grating according to another embodiment of the present disclosure.

FIG. 6 illustrates a stereoscopic view of a liquid crystal grating 130d according to another embodiment of the present disclosure. Referring to both FIG. 1B and FIG. 6, in one embodiment, the liquid crystal grating 130d is the liquid crystal coupler 130 shown in FIG. 1B and FIG. 2. The liquid crystal grating 130d includes a substrate 132d, transparent electrodes 134d and a liquid crystal layer 136d. The transparent electrodes 134d are located on the substrate 132d, and the liquid crystal layer 136d is located on the transparent electrodes 134d. The transparent electrodes 134d of the liquid crystal grating 130d are separated from each other by a second distance d2. In one embodiment, because the transparent electrodes 134d of the liquid crystal grating 130d are separated from each other by the second distance d2, different voltages may be applied to the transparent electrodes 134d. For example, when the voltage of the transparent electrodes 134d of the liquid crystal grating 130d is off, a longitudinal direction of the liquid crystal of the liquid crystal layer 136d is parallel to the horizontal direction D1 (such as a first row of the liquid crystal layer 136d shown in FIG. 6).

However, when the voltage of a portion of the transparent electrodes 134d of the liquid crystal grating 130d is on, a portion of the liquid crystal of the liquid crystal layer 136d rotates in the vertical direction D2, so that the longitudinal direction of a portion of the liquid crystal of the liquid crystal layer 136d is parallel to the vertical direction D2 (such as a second row of the liquid crystal layer 136d shown in FIG. 6). Therefore, the liquid crystal grating 130d may rotate a portion of the liquid crystal of the liquid crystal layer 136d to the vertical direction D2 by changing the voltage of the transparent electrodes 134d, so as to change the incident angle θ1 that the light L emits to the first holographic optical element 140. When the light L passes through the first holographic optical element 140, the first holographic optical element 140 may provide a coupling effect and the light L may have an initial diffraction angle θ2, so that the light L may be totally reflected in the waveguide element 120. After the light L passes through the second holographic optical element 150, it may have the emergent angle θ3, so that the light L may be transmitted to the waveguide element 120 below.

In the following description, an operating method of a display device will be described.

Figure 7:
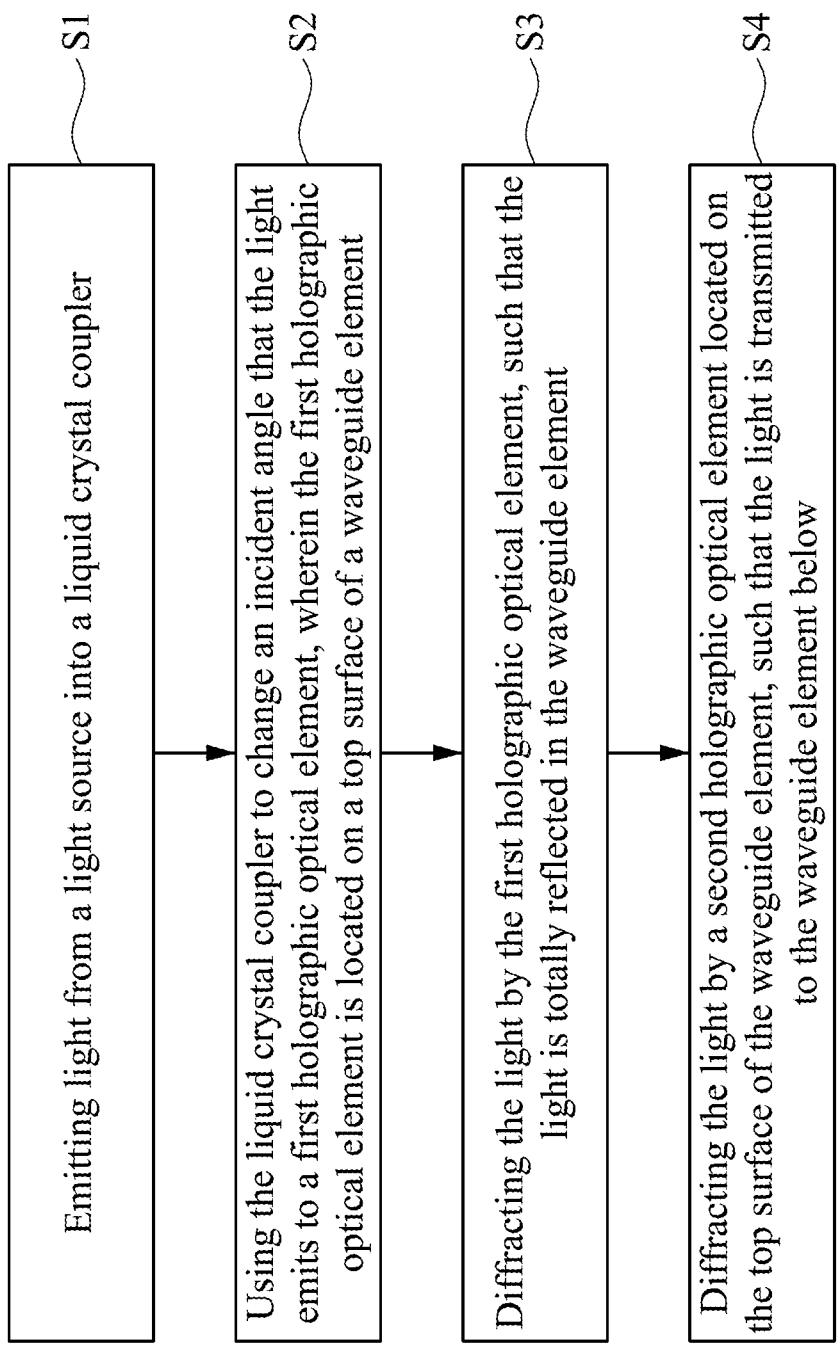
FIG. 7 illustrates a flow chart of an operating method of display device according to one embodiment of the present disclosure.

FIG. 7 illustrates a flow chart of an operating method of a display device according to one embodiment of the present disclosure. The operating method of the display device includes steps as outlined below. In step S1, light is emitted from a light source into a liquid crystal coupler. In step S2, the liquid crystal coupler is used to change an incident angle that the light emits to a first holographic optical element, in which the first holographic optical element is located on a top surface of a waveguide element. In step S3, the light is diffracted by the first holographic optical element, such that the light is totally reflected in the waveguide element. In step S4, the light is diffracted by a second holographic optical element located on the top surface of the waveguide element, such that the light is transmitted to the waveguide element below. In the following description, the aforementioned steps will be described in detail.

Referring to both FIG. 1B and FIG. 7, in step S1, the light L is emitted from the light source 110 into the liquid crystal coupler 130. In step S2, the liquid crystal coupler 130 is used to change an incident angle θ1 that the light L emits to the first holographic optical element 140, in which the first holographic optical element 140 is located on the top surface 122 of the waveguide element 120. In step S3, the light L is diffracted by the first holographic optical element 140, such that the light L is totally reflected in the waveguide element 120. In step S4, the light L is diffracted by the second holographic optical element 150 located on the top surface 122 of the waveguide element 120, such that the light L is transmitted to the waveguide element 120 below.

In addition, the second holographic optical element 150 has high sensitivity to the initial diffraction angle θ2 of the light L, that is to say, the light L only passes through the specific position of the second holographic optical element 150 (for example, the first grating 152, the second grating 154 or the third grating 156), the light L is decoupled and transmitted to the waveguide element 120 below. As a result, the energy of the light L is relatively concentrated and not easier to disperse, so the display device 100 has the characteristics of high optical efficiency, the high field of view F, and the high Eye Box E.

In one embodiment, emitting light L from the light source 110 into the liquid crystal coupler 130 further includes emitting red light, green light and blue light to the liquid crystal coupler 130 at intervals. For example, emitting the red light, the green light and the blue light at intervals may be that the light source 110 emits the red light first, and after 3 ms, the light source 110 changes to emit the green light, and after another 3 ms, the light source 110 changes to emit the blue light and repeats the cycle to emit the red, the green and the blue light.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A display device, comprising:
a light source configured to emit red light, green light and blue light at intervals every three milliseconds;
a waveguide element located above the light source;
a liquid crystal coupler located between the waveguide element and the light source and configured to receive the red light, the green light and the blue light;
a first holographic optical element located on a top surface of the waveguide element, wherein the liquid crystal coupler is configured to change an incident angle that each of the red light, the green light and the blue light emits to the first holographic optical element; and
a second holographic optical element located on the top surface of the waveguide element, wherein there is a first distance in a horizontal direction between the first holographic optical element and the second holographic optical element, and the second holographic optical element is configured to diffract the red light, the green light and the blue light to the waveguide element below, the second holographic optical element has a first grating, a second grating adjacently disposed to the first grating along the horizontal direction, and a third grating adjacently disposed to the second grating along the horizontal direction, wherein the first grating is made of a different material than the second grating and the third grating, and the second grating is made of a different material than the third grating, the first grating is closer to the first holographic optical element than the third grating, and a refractive index of the first grating is lower than a refractive index of the third grating.

2. The display device of claim 1, wherein the liquid crystal coupler is a liquid crystal lens group, the liquid crystal lens group comprises a first lens, a transparent electrode and a first liquid crystal layer, and the first liquid crystal layer is located between the first lens and the transparent electrode.

3. The display device of claim 2, wherein the liquid crystal lens group is configured to change an optical axis direction of the first lens by adjusting an electric field of the first liquid crystal layer.

4. The display device of claim 2, wherein the liquid crystal lens group further comprises a second lens and a second liquid crystal layer, the transparent electrode is located between the first liquid crystal layer and the second liquid crystal layer, and the second liquid crystal layer is located between the second lens and the transparent electrode.

5. The display device of claim 4, wherein a longitudinal direction of liquid crystal of the first liquid crystal layer is different from a longitudinal direction of liquid crystal of the second liquid crystal layer.

6. The display device of claim 1, wherein the liquid crystal coupler is a liquid crystal prism, the liquid crystal prism comprises a substrate, a transparent electrode and a liquid crystal layer, and the transparent electrode is located on the substrate, and the liquid crystal layer is located on the transparent electrode.

7. The display device of claim 6, wherein the liquid crystal prism is configured to rotate liquid crystal of the liquid crystal layer to a vertical direction to change a refractive index of the liquid crystal prism by changing a voltage of the transparent electrode.

8. The display device of claim 6, wherein the liquid crystal prism is configured to rotate liquid crystal of the liquid crystal layer to a horizontal direction to change a refractive index of the liquid crystal prism by changing a voltage of the transparent electrode.

9. The display device of claim 1, wherein the liquid crystal coupler is a liquid crystal grating, the liquid crystal grating comprises a substrate, transparent electrodes and a liquid crystal layer, the transparent electrodes are located on the substrate, and the liquid crystal layer is located on the transparent electrodes.

10. The display device of claim 9, wherein the transparent electrodes of the liquid crystal grating are separated from each other by a second distance.

11. The display device of claim 9, wherein the liquid crystal grating is configured to rotate a portion of liquid crystal of the liquid crystal layer to a vertical direction by changing a voltage of the transparent electrodes.

12. The display device of claim 1, wherein the liquid crystal coupler is configured to control the red light, the green light and the blue light to be emitted to the first holographic optical element at different incident angles.

13. The display device of claim 1, wherein the second holographic optical element is configured to diffract the red light, the green light and the blue light, and the red light, the green light and the blue light after being diffracted by the second holographic optical element all have a same emergent angle.

14. The display device of claim 1, wherein the first grating, the second grating and the third grating diffract the red light, the green light and the blue light, respectively.

15. The display device of claim 1, wherein a refractive index of the second grating is higher than a refractive index of the first grating and is lower than a refractive index of the third grating.

16. An operating method of a display device, comprising:
emitting red light, green light and blue light at intervals every three milliseconds from a light source into a liquid crystal coupler;
using the liquid crystal coupler to change an incident angle that each of the red light, the green light and the blue light emits to a first holographic optical element, wherein the first holographic optical element is located on a top surface of a waveguide element;
diffracting the red light, the green light and the blue light by the first holographic optical element, such that the red light, the green light and the blue light are totally reflected in the waveguide element; and
diffracting the red light, the green light and the blue light by a second holographic optical element located on the top surface of the waveguide element, such that the red light, the green light and the blue light are transmitted to the waveguide element below, wherein the second holographic optical element has a first grating, a second grating adjacently disposed to the first grating along a horizontal direction, and a third grating adjacently disposed to the second grating along the horizontal direction, wherein the first grating is made of a different material than the second grating and the third grating, and the second grating is made of a different material than the third grating, the first grating is closer to the first holographic optical element than the third grating, and a refractive index of the first grating is lower than a refractive index of the third grating.

* * * * *